US012496829B2

(12) United States Patent
Somete

(10) Patent No.: US 12,496,829 B2
(45) Date of Patent: Dec. 16, 2025

(54) CAP UNIT

(71) Applicant: KYOCERA Document Solutions Inc., Osaka (JP)

(72) Inventor: Takashi Somete, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 145 days.

(21) Appl. No.: 18/391,094

(22) Filed: Dec. 20, 2023

(65) Prior Publication Data

US 2024/0208227 A1 Jun. 27, 2024

(30) Foreign Application Priority Data

Dec. 26, 2022 (JP) ................................. 2022-208895

(51) Int. Cl.
*B41J 2/165* (2006.01)

(52) U.S. Cl.
CPC .. *B41J 2/16552* (2013.01); *B41J 2002/16555* (2013.01)

(58) Field of Classification Search
CPC .......... B41J 2/16552; B41J 2002/16555; B41J 2/16508; B41J 2/16523
See application file for complete search history.

(56) References Cited

U.S. PATENT DOCUMENTS

2010/0253738 A1* 10/2010 Jariabka ............... B41J 2/16532 347/32
2012/0154474 A1 6/2012 Hazeyama
2023/0311511 A1* 10/2023 Okumura ............... C09D 11/40 347/29

FOREIGN PATENT DOCUMENTS

JP 2012-131064 A 7/2012
JP 2012171342 A * 9/2012
JP 2020032590 A * 3/2020 .......... B41J 2/16535

OTHER PUBLICATIONS

Machine English translation JP 2018-016035 A and original patent (Year: 2018).*

* cited by examiner

*Primary Examiner* — Sharon Polk
(74) *Attorney, Agent, or Firm* — Studebaker Brackett PLLC

(57) ABSTRACT

A cap unit includes a cap, a tank, a first pipe, a second pipe, a pump, and a vent port. The cap is attached to and detached from a nozzle surface of an inkjet head. The tank stores humidifying liquid. The first pipe and the second pipe connect the cap and the tank. The pump is provided in the first pipe and pumping air in the tank into the cap. The vent port is provided in the cap.

9 Claims, 14 Drawing Sheets

I – I

CAP UNIT

INCORPORATION BY REFERENCE

This application is based on and claims the benefit of priority from Japanese patent application No. 2022-208895 filed on Dec. 26, 2022, which is incorporated by reference in its entirety.

BACKGROUND

The present disclosure relates to a cap unit.

In an inkjet recording apparatus that uses water-based ink, there is a problem that moisture evaporates from the ink in a nozzle while printing is not performed, resulting in an increase in viscosity. This causes ejection failure and clogging. Therefore, a technique to suppress the evaporation of moisture from the ink in the nozzle has been conventionally discussed. For example, a head holder holding a head is provided with an annular cap covering an ejection surface, and when humidifying maintenance is performed, in a state where a projection of the cap comes into contact with a support surface of a conveyance belt, humidified air is supplied into an ejection space formed between the ejection surface and the support surface until concentration or viscosity of ink in an ejection port becomes less than an appropriate value.

However, in the above configuration, since the space inside the cap is sealed, if a temperature inside the cap changes, condensation may occur on the nozzle surface, which may reduce the viscosity of the ink. In addition, air pressure changes according to the temperature change in the cap, which may cause meniscus in the nozzle to collapse and make it impossible to eject the ink.

SUMMARY

A cap unit according to the present disclosure includes a cap, a tank, a first pipe, a second pipe, a pump, and a vent port. The cap is attached to and detached from a nozzle surface of an inkjet head. The tank stores humidifying liquid. The first pipe and the second pipe connect the cap and the tank. The pump is provided in the first pipe and pumping air in the tank into the cap. The vent port is provided in the cap.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the drawings, an inkjet recording apparatus 1 and a cap unit 70 according to one embodiment of the present disclosure will be described.

Figure 1:
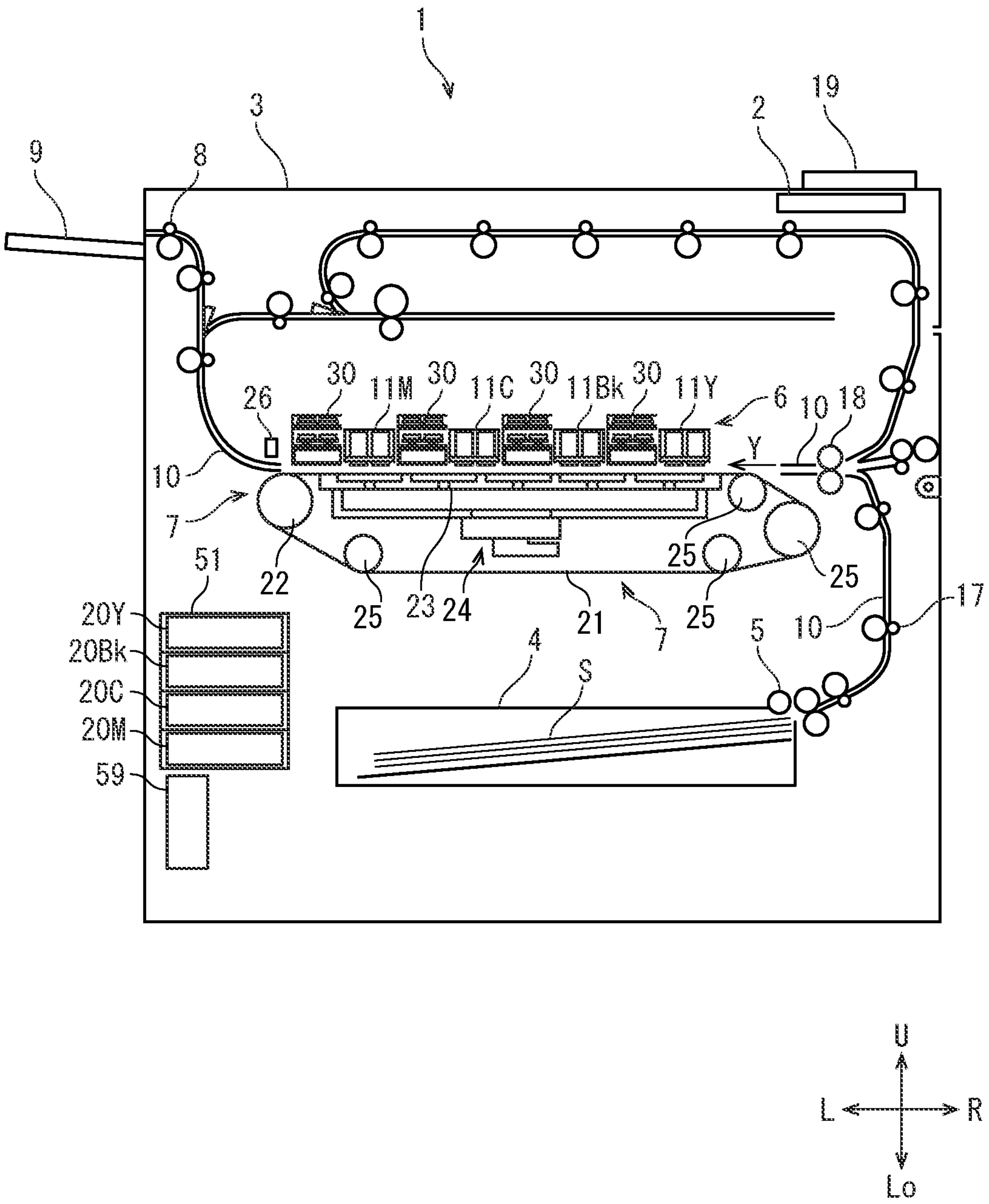
FIG. 1 is a front view schematically showing an inside of an inkjet recording apparatus 1 according to one embodiment of the present disclosure.
Figure 2:
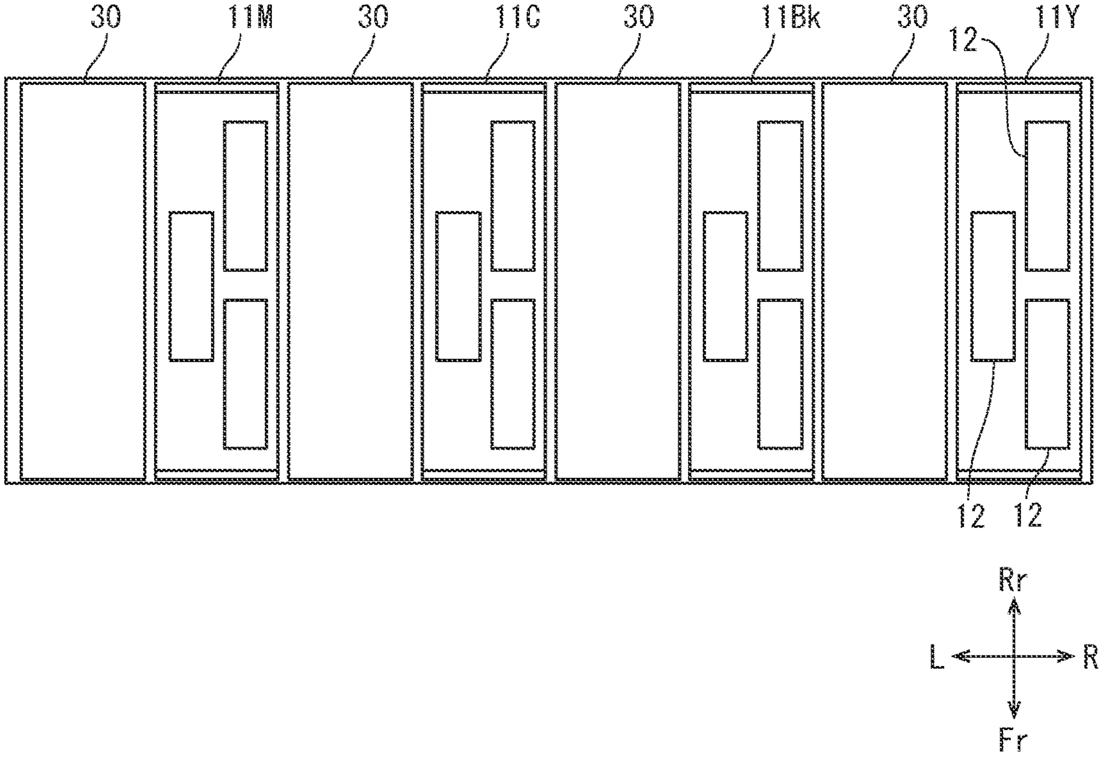
FIG. 2 is a plan view showing an image forming unit 6 according to the embodiment of the present disclosure.
Figure 3:
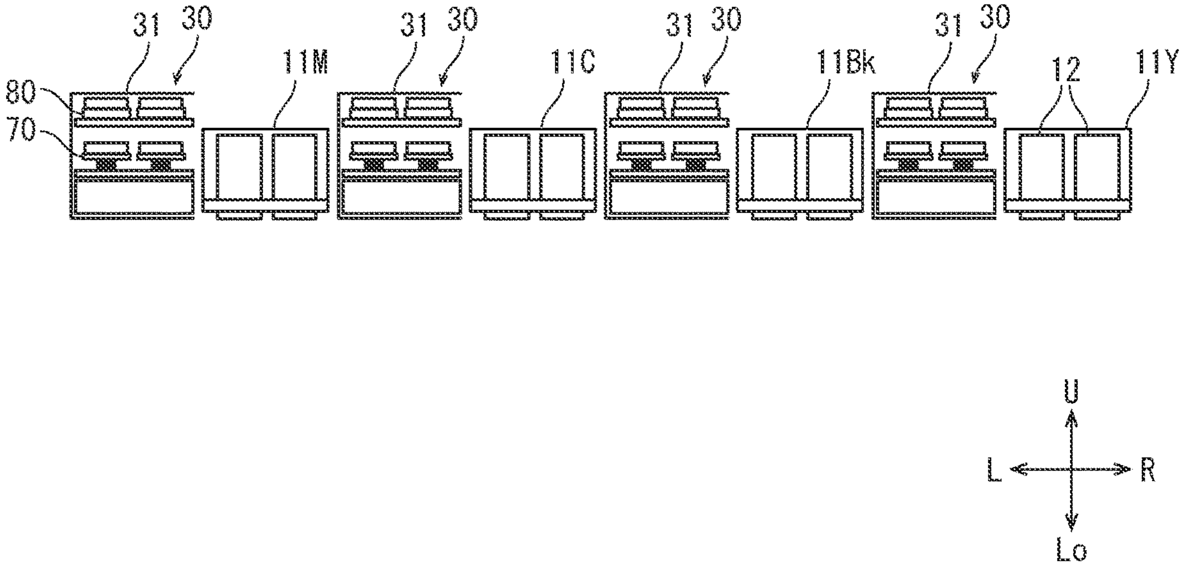
FIG. 3 is a cross-sectional view showing the image forming unit 6 according to the embodiment of the present disclosure.
Figure 4:
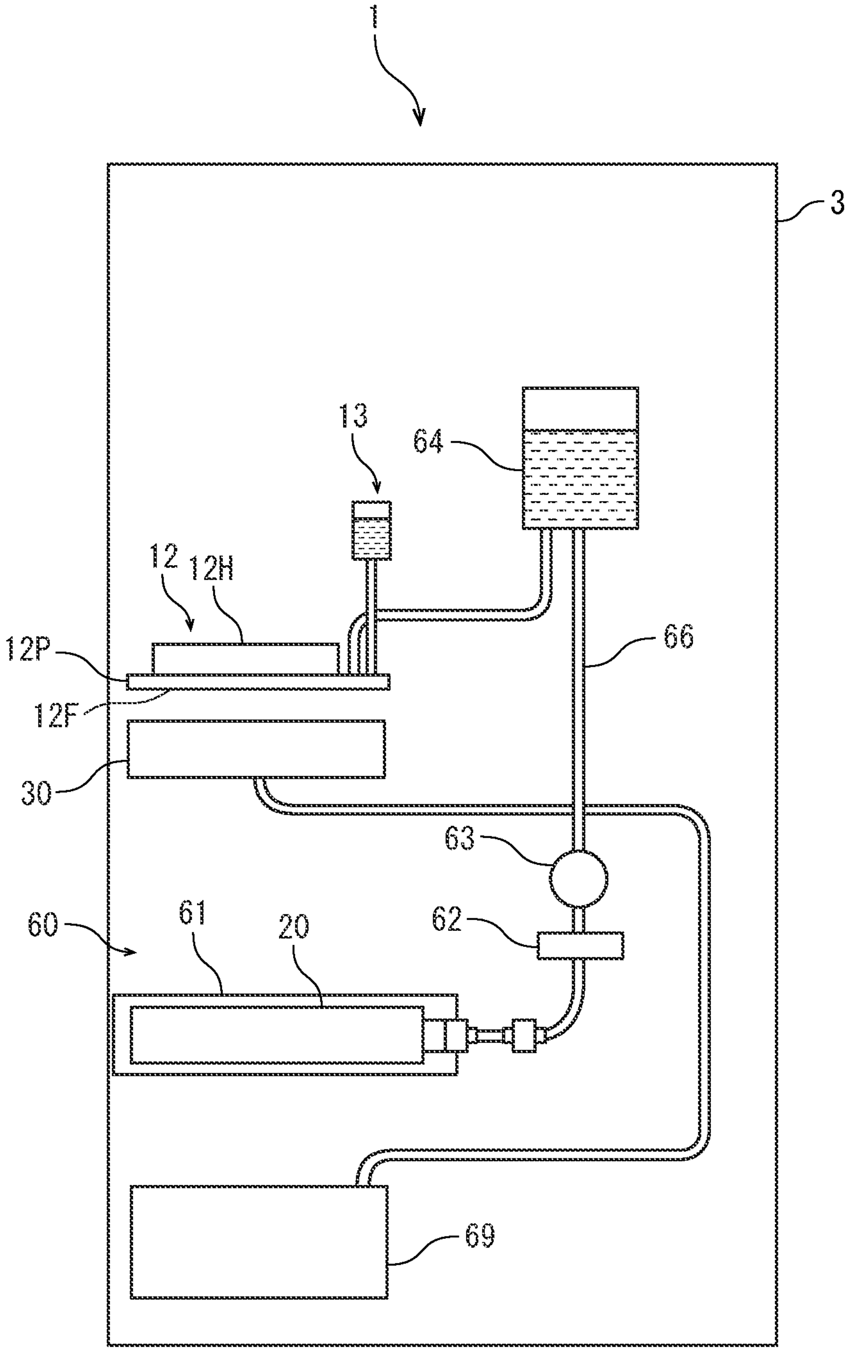
FIG. 4 is a view schematically showing an ink supply path 60 according to the embodiment of the present disclosure.
Figure 5:
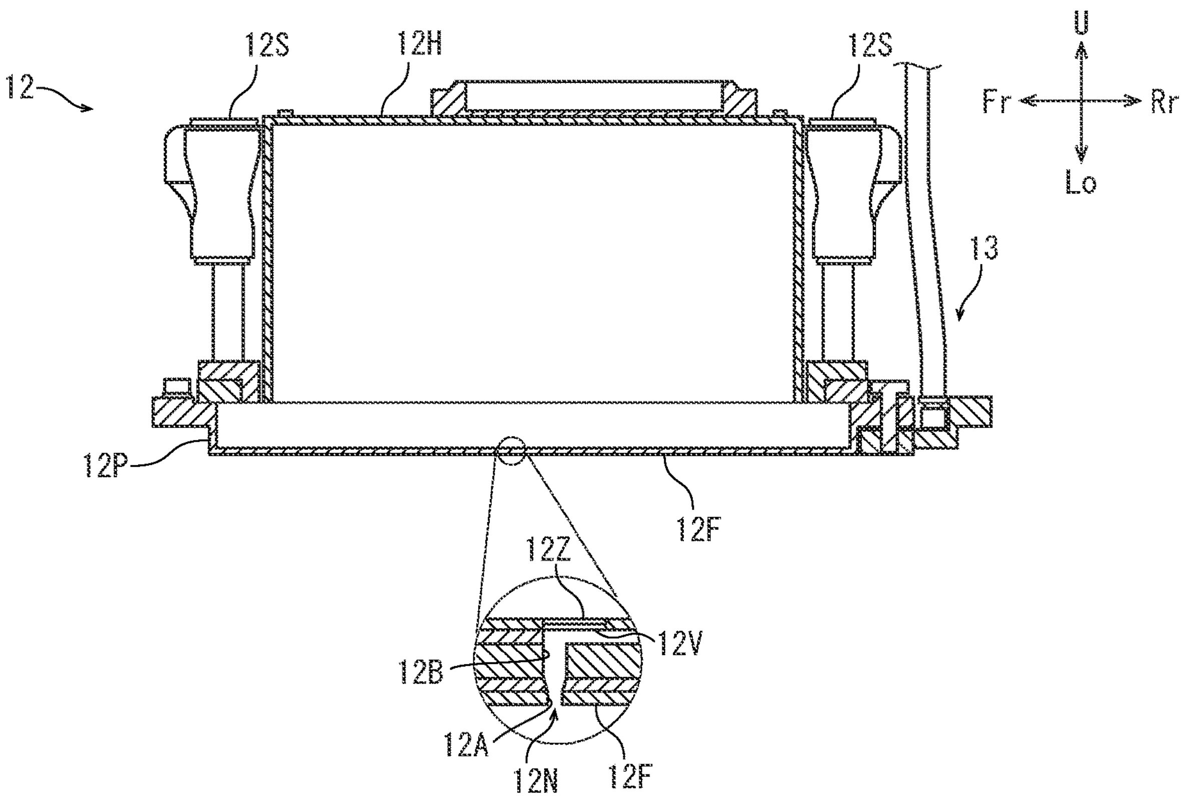
FIG. 5 is a cross-sectional view showing an inkjet head according to the embodiment of the present disclosure.

First, an entire structure of the inkjet recording apparatus 1 will be described. FIG. 1 is a front view schematically showing the inside of the inkjet recording apparatus 1. FIG. 2 is a plan view showing an image forming unit 6. FIG. 3 is a cross-sectional view showing the image forming unit 6. FIG. 4 is a view schematically showing an ink supply path 60. FIG. 5 is a cross-sectional view showing an inkjet head 12. Hereafter, the front side of the paper plane on which FIG. 1 is drawn is defined as the front side of the inkjet recording apparatus 1, and the left-and-right direction is described with reference to the direction in which the inkjet recording apparatus 1 is viewed from the front side. In each figure, U, Lo, L, R, Fr and Rr indicate the upper, lower, left, right, front and rear, respectively.

The inkjet recording apparatus 1 (see FIG. 1) has a rectangular box-shaped body housing 3. In the lower portion in the body housing 3, a sheet feeding cassette 4 in which a sheet S such as a plain paper and a coated paper is stored and a sheet feeding roller 5 which feeds the sheet S from the sheet feeding cassette 4 are provided. Above the sheet feeding cassette 4, a conveyance unit 7 is provided to attract the sheet S and convey it in the Y direction. Above the conveyance unit 7, the image forming unit 6 is provided to form an image by ejecting ink. In the left and upper portion in the body housing 3, a discharge roller 8 which discharges the sheet S having the image and a discharge tray 9 on which the discharged sheet S is stacked are provided.

Inside the body housing 3, a conveyance path 10 is provided from the sheet feeding roller 5 through a gap between the conveyance unit 7 and the image forming unit 6 to the discharge roller 8. The conveyance path 10 is formed mainly by plate-like members facing each other with a gap for passing the sheet S. On the conveyance path 10, conveyance rollers 17 which hold the sheet S and convey it are provided. A registration roller 18 is provided on the upstream side of the image forming unit 6 in the conveyance direction Y.

The conveyance unit 7 includes an endless conveyance belt 21, a support plate 23, and a suction part 24. The conveyance belt 21 has a number of vent holes (not shown) and is wound around a drive roller 25 and a driven roller 22. The support plate 23 has a number of vent holes, and the upper surface is in contact with the inner surface of the conveyance belt 21. The suction part 24 attracts the sheet S to the conveyance belt 21 by sucking air through the vent holes of the support plate 23 and the vent holes of the conveyance belt 21. When the drive roller 25 is driven in the counterclockwise direction by a drive unit (not shown) including a motor and a reduction gear, the conveyance belt 21 travels in the counterclockwise direction, and the sheet S attracted to the conveyance belt 21 is conveyed in the Y direction.

The inkjet recording apparatus 1 includes an ink supply path 60 (see FIG. 4). In FIG. 4, the ink supply path 60 corresponding to one color of the ink is shown, but since four colors of the ink are used in this embodiment, four ink supply paths 60 are provided. The inkjet recording apparatus 1 includes a container attachment part 61 to which an ink container 20 is attached, a filter 62 which filters the ink, a pump 63 which pumps the ink from the ink container 20 through the filter 62, and a sub-tank 64 in which the ink fed by the pump 63 is stored.

The image forming unit 6 includes head units 11Y, 11Bk, 11C and 11M (collectively referred to as a head unit 11). The head unit 11 contains one or more inkjet heads 12, for example, three inkjet heads 12 arranged in a staggered manner (see FIG. 2). The ink containers 20Y, 20Bk, 20C and 20M (collectively referred to as the ink container 20) filled with the yellow, black, cyan and magenta inks are connected to the head units 11Y, 11Bk, 11C and 11M, respectively.

The inkjet head 12 (see FIG. 5) includes a rectangular box-shaped housing 12H whose longitudinal direction is along the front-and-rear direction and a nozzle plate 12P provided at the bottom portion of the housing 12H. The nozzle plate 12P has a number of nozzles 12N lined up in the front-and-rear direction and a socket 12S connected to the sub-tank 64. The nozzle 12N includes a branched flow path 12B branched from a flow path leading to the sub-tank 64 and an ejection port 12A provided on a nozzle surface 12F, which is the lower surface of the nozzle plate 12P. A diaphragm 12V is served as a part of the inner wall of the branched flow path 12B. The diaphragm 12V is provided with a pressurizing element 12Z. As the pressurizing element 12Z, a piezoelectric element, an electrostatic actuator, a heater or the like is used. The inkjet head 12 is provided with a drive circuit (not shown) to drive the pressurizing element 12Z. The inkjet head 12 is provided with a cleaning liquid supply part 13 which supplies cleaning liquid to the nozzle surface 12F.

A control part 2 (see FIG. 1) includes an arithmetic part and a storage part (not shown). The arithmetic part is, for example, a CPU (Central Processing Unit). The storage part includes storage media such as ROM (Read Only Memory), RAM (Random Access Memory) and EEPROM (Electrically Erasable Programmable Read Only Memory). The arithmetic part performs various processes by reading and executing control program stored in the storage part. The control part 2 may be realized by an integrated circuit without using software.

A display operating part 19 is provided on the upper portion of the body housing 3 (see FIG. 1). The display operating part 19 includes a display panel, a touch panel laminated on the display panel, and a keypad (not shown). The control part 2 displays a screen showing the operation menu, status or the like of the inkjet recording apparatus 1 on the display panel, and controls each part of the inkjet recording apparatus 1 according to the operation detected by the touch panel and the keypad.

The basic image forming operation of the inkjet recording apparatus 1 is as follows. When an image forming job is input to the inkjet recording apparatus 1 from the display operating part 19 or an external computer, the sheet feeding roller 5 feeds the sheet S from the sheet feeding cassette 4 to the conveyance path 10, and the registration roller 18, whose rotation has been stopped, corrects the skew of the sheet S. When the registration roller 18 feeds the sheet S to the conveyance unit 7 at a prescribed timing, the conveyance unit 7 attracts the sheet S to the conveyance belt 21 and conveys it in the Y direction. When the control part 2 supplies a raster-type image data to the drive circuit in synchronization with the conveyance of the sheet S, the drive circuit supplies an ejection signal corresponding to the gradation of the image data to the pressurizing element 12Z, and the ink is ejected from the nozzle 12N to form an image on the sheet S. The discharge roller 8 discharges the sheet S on which the image is formed to the discharge tray 9.

Figure 6:
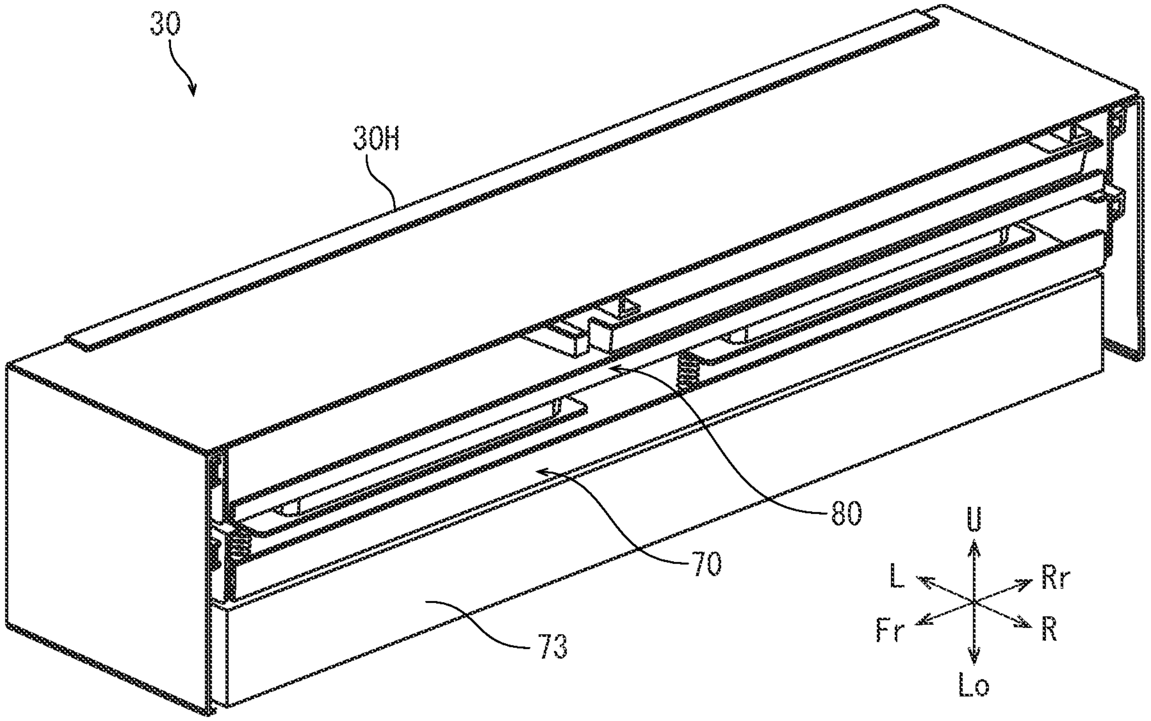
FIG. 6 is a perspective view showing a maintenance device according to the embodiment of the present disclosure.
Figure 7:
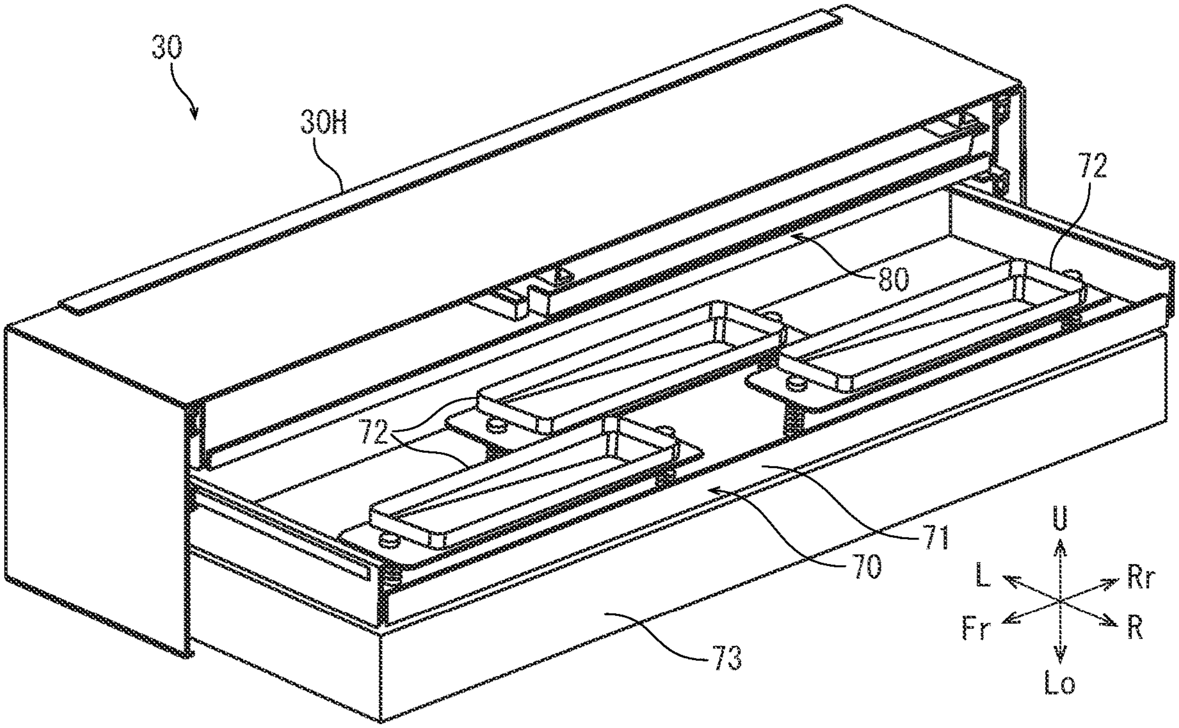
FIG. 7 is a perspective view showing a cap unit moved rightward, according to the embodiment of the present disclosure.
Figure 8:
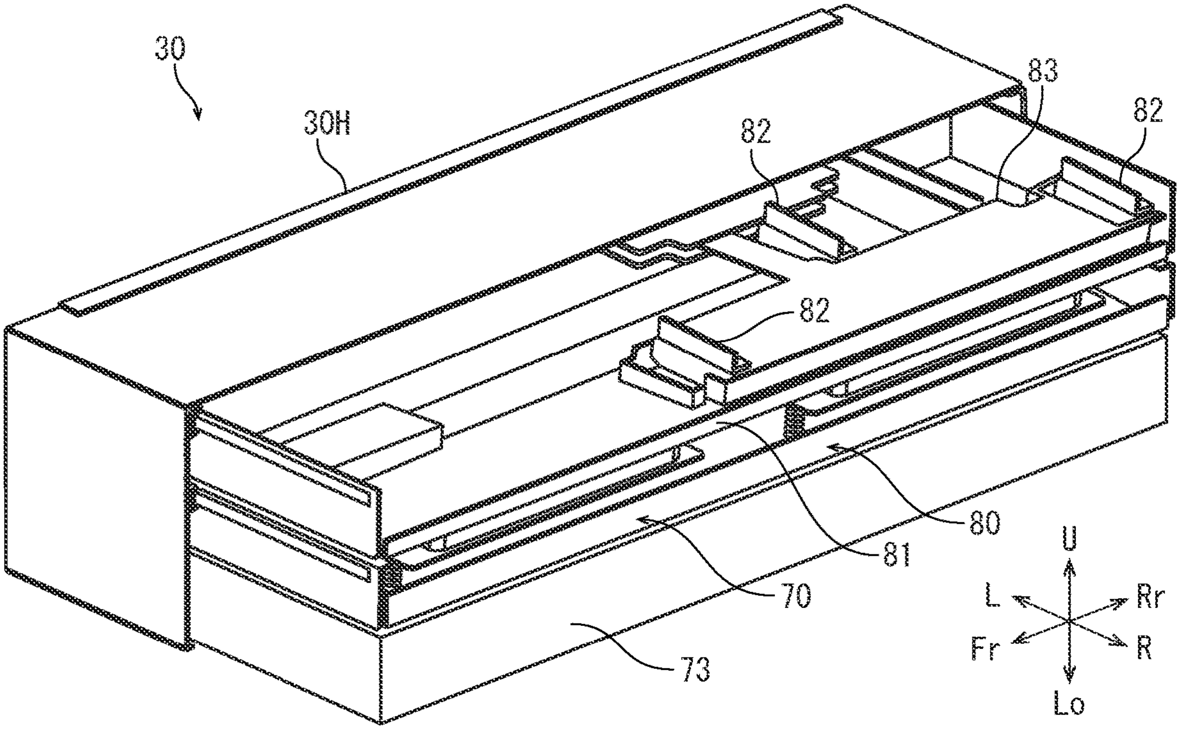
FIG. 8 is a perspective view showing a wipe unit and the cap unit which are moved rightward, according to the embodiment of the present disclosure.
Figure 9:
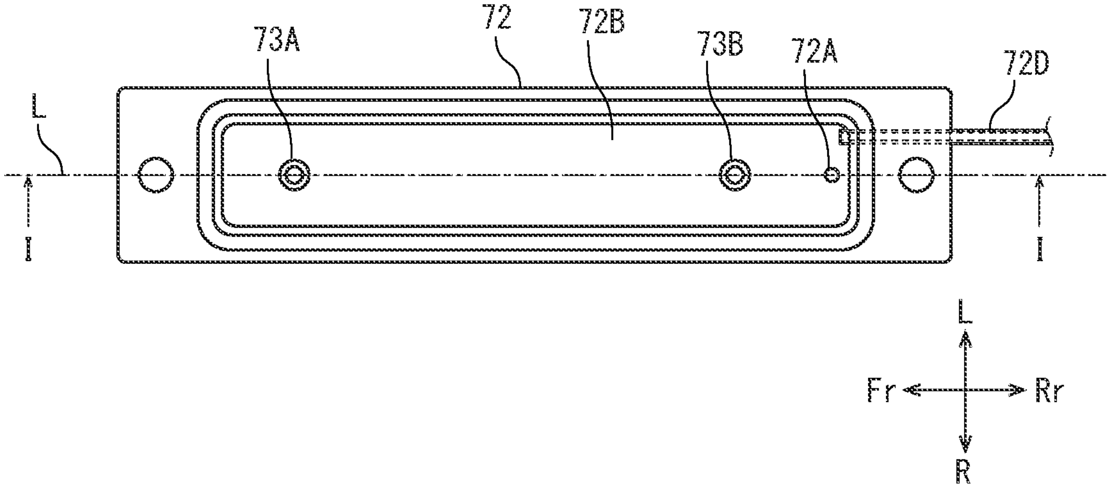
FIG. 9 is a plan view showing a cap according to the embodiment of the present disclosure.
Figure 10:
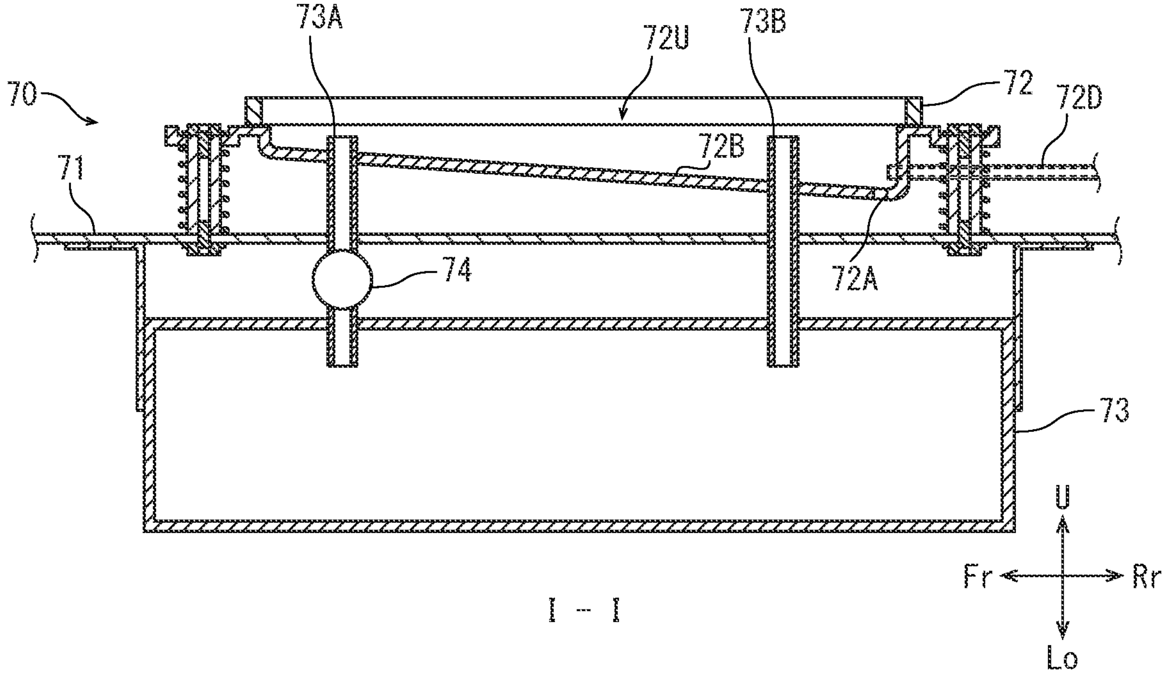
FIG. 10 is a cross-sectional view showing the cap according to the embodiment of the present disclosure (a cross-sectional view taken along the line I-I in FIG. 9).
Figure 11:
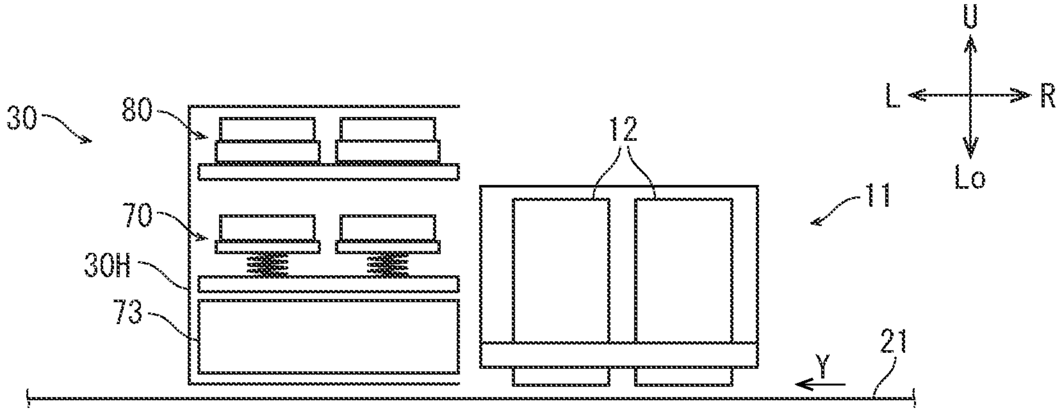
FIG. 11 is a cross-sectional view explaining an operation of the maintenance device and the head unit 11 according to the embodiment of the present disclosure.

[Maintenance Device] Next, a configuration of a maintenance device 30 will be described. FIG. 6 is a perspective view showing the maintenance device 30. FIG. 7 is a perspective view showing a cap unit 70 moved rightward. FIG. 8 is a perspective view showing a wipe unit 80 and the cap unit 70 which are moved rightward. FIG. 9 is a plan view showing a cap 72. FIG. 10 is a cross-sectional view showing the cap 72 (a cross-sectional view taken along the line I-I in FIG. 9).

The maintenance device 30 is provided for each head unit 11 on the left side of the head unit 11 (on the downstream side in the conveyance direction Y) (see FIG. 2 and FIG. 3). The maintenance device 30 may be provided on the right side of the head unit 11 (on the upstream side in the conveyance direction Y).

The maintenance device 30 includes the cap unit 70 with the cap 72 attached to the nozzle surface 12F, the wipe unit 80 with a wipe blade 82 which removes the ink remaining on the nozzle surface 12F, and a housing 31 in which the cap unit 70 and the wipe unit 80 are housed. The housing 31 is formed in a rectangular box-like shape whose longitudinal direction is along the front-and-rear direction, and an opening is provided on the right side surface. The maintenance device 30 includes a cap moving mechanism (not shown) for moving the cap unit 70 in the left-and-right direction and a wipe moving mechanism (not shown) for moving the wipe unit 80 in the left-and-right direction.

[Cap Unit] The cap unit 70 (see FIG. 7) includes a frame 71 and the caps 72 provided above the frame 71. The frame 71 is formed into a rectangular shape whose longitudinal direction is along the front-and-rear direction. The same number of caps 72 as the inkjet heads 12 are arranged on the frame 71 in a staggered manner as with the inkjet heads 12. The cap 72 has a recess 720 opened upward. The recess 720 has a size that surrounds the nozzle surface 12F of one inkjet head 12. The bottom portion 72B of the recess 72U is inclined so that one side (in this example, the rear side) in the front-and-rear direction is lower. At the lower end portion of the bottom portion 72B of the recess 72U, a discharge port 72A is provided. A waste liquid tank 69 (see FIG. 4) is connected to the discharge port 72A.

[Wipe Unit] The wipe unit 80 (see FIG. 8) includes a frame 81, a carriage 83 provided above the frame 81, the wipe blades 82 protruding upward from the carriage 83, and a carriage moving mechanism (not shown) for moving the carriage 83 in the front-and-rear direction. The frame 81 is formed into a rectangular shape whose longitudinal direction is along the front-and-rear direction. The same number of wipe blades 82 as the inkjet heads 12 are arranged on the carriage 83 in a staggered manner as with the inkjet heads 12.

[Lifting Mechanism] The inkjet recording apparatus 1 includes a lifting mechanism (not shown) for lifting and lowering the head unit 11. The lifting mechanism lifts and lowers the head unit 11 between an image forming position when the image forming operation is performed and a retreating position above the image forming position. At the image forming position, the head unit 11 is positioned so that a distance between the conveyance belt 21 and the nozzle surface 12F is a predetermined distance. At the retreating position, a space is formed between the conveyance belt 21 and the nozzle surface 12F in which the cap unit 70 and the wipe unit 80 can be moved.

Next, the operation of the maintenance device 30 will be described. FIG. 11 to FIG. 16 are cross-sectional views explaining the operation of the maintenance device 30 and the head unit 11. Hereinafter, a state in which the head unit 11 is positioned at the image forming position (see FIG. 11) is described as the initial state. The operation shown below is performed by the control part 2 controlling the lifting mechanism, the cap moving mechanism, the wipe moving mechanism and the carriage moving mechanism.

Figure 12:
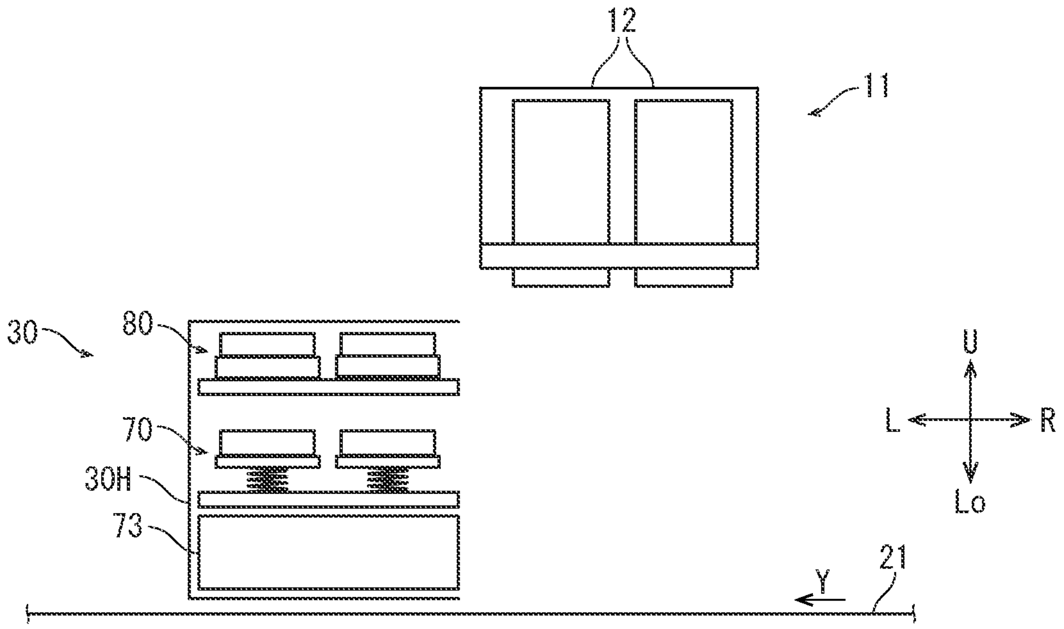
FIG. 12 is a cross-sectional view explaining the operation of the maintenance device and the head unit 11 according to the embodiment of the present disclosure.

First, the control part 2 operates the lifting mechanism to lift the head unit 11 to the retreating position (see FIG. 12). Then, the control part 2 operates the cap moving mechanism to move the cap unit 70 below the head unit 11 (see FIG. 13). Next, the control part 2 operates the lifting mechanism to lower the head unit 11 to a height where the nozzle surface 12F is in contact with the caps 72 (see FIG. 14). Next, the control part 2 controls the inkjet head 12 to cause the cap 72 to purge the ink.

Figure 13:
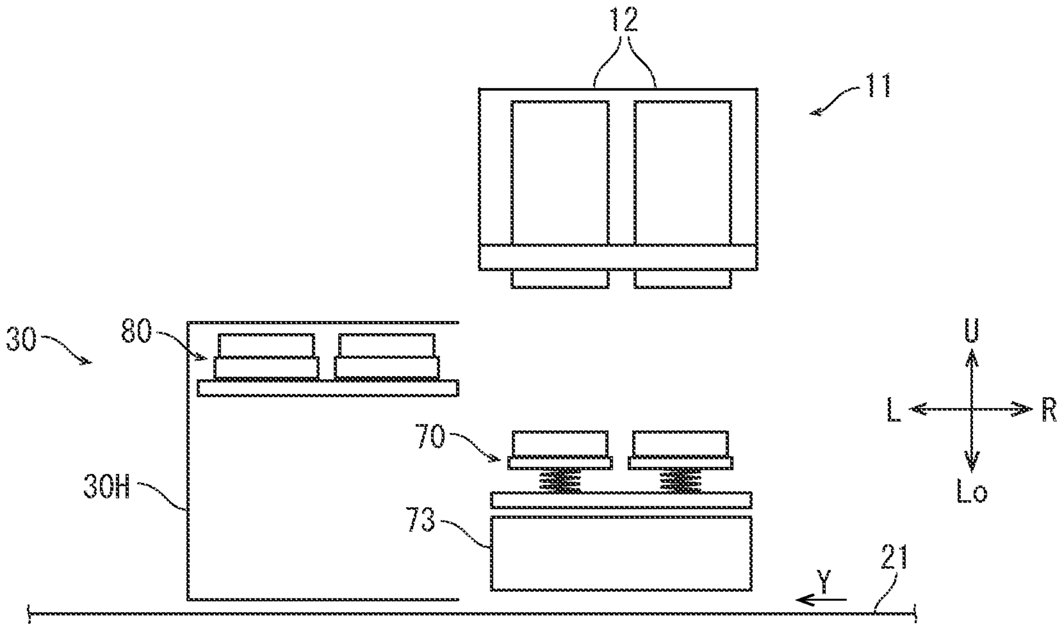
FIG. 13 is a cross-sectional view explaining the operation of the maintenance device and the head unit 11 according to the embodiment of the present disclosure.
Figure 14:
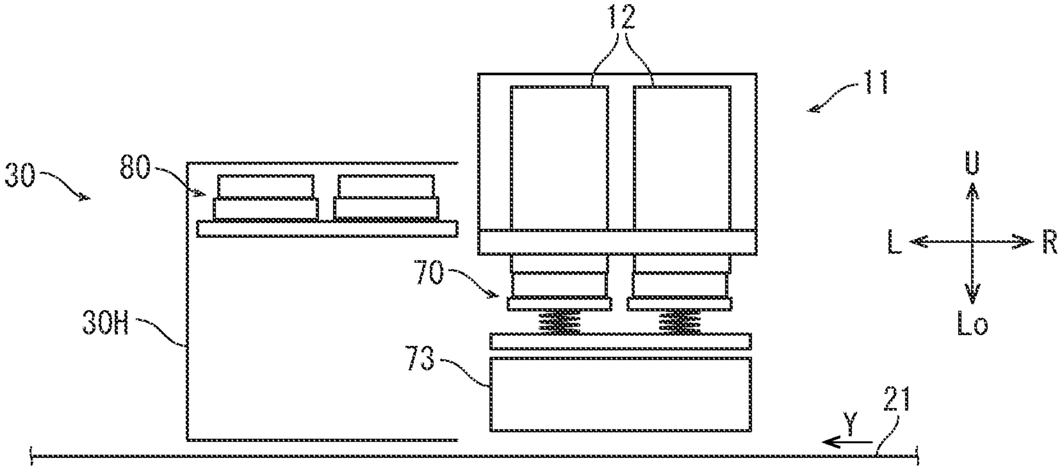
FIG. 14 is a cross-sectional view explaining the operation of the maintenance device and the head unit 11 according to the embodiment of the present disclosure.

Next, the control part 2 operates the lifting mechanism to lift the head unit 11 to the retreating position (see FIG. 13). Next, the control part 2 operates the wipe moving mechanism to move the wipe unit 80 below the head unit 11 (see FIG. 15). The control part 2 then operates the lifting mechanism to lower the head unit 11 to a height where the nozzle surface 12F is in contact with the wipe blades 82 (see FIG. 16).

Then, the control part 2 operates the cleaning liquid supply part 13 to supply the cleaning liquid to the nozzle surface 12F, and operates the carriage moving mechanism to move the wipe blade 82. The wipe blade 82 is moved while scraping the cleaning liquid and the ink from the nozzle surface 12F. The ink is diluted with the cleaning liquid and falls off. The waste liquid, which is a mixture of the ink and the cleaning liquid, is received by the cap 72.

Figure 15:
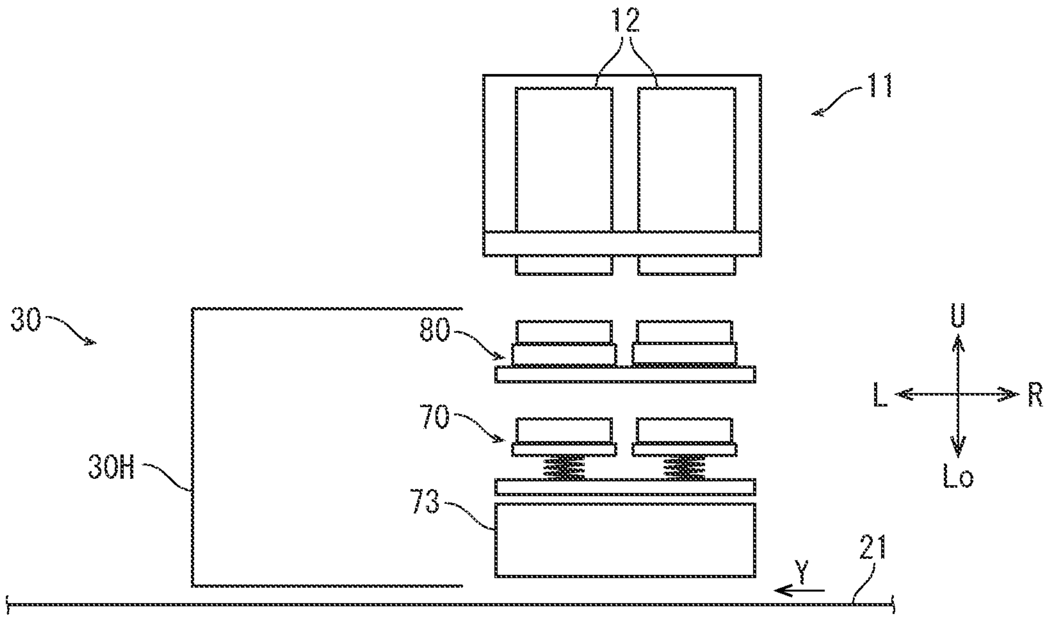
FIG. 15 is a cross-sectional view explaining the operation of the maintenance device and the head unit 11 according to the embodiment of the present disclosure.
Figure 16:
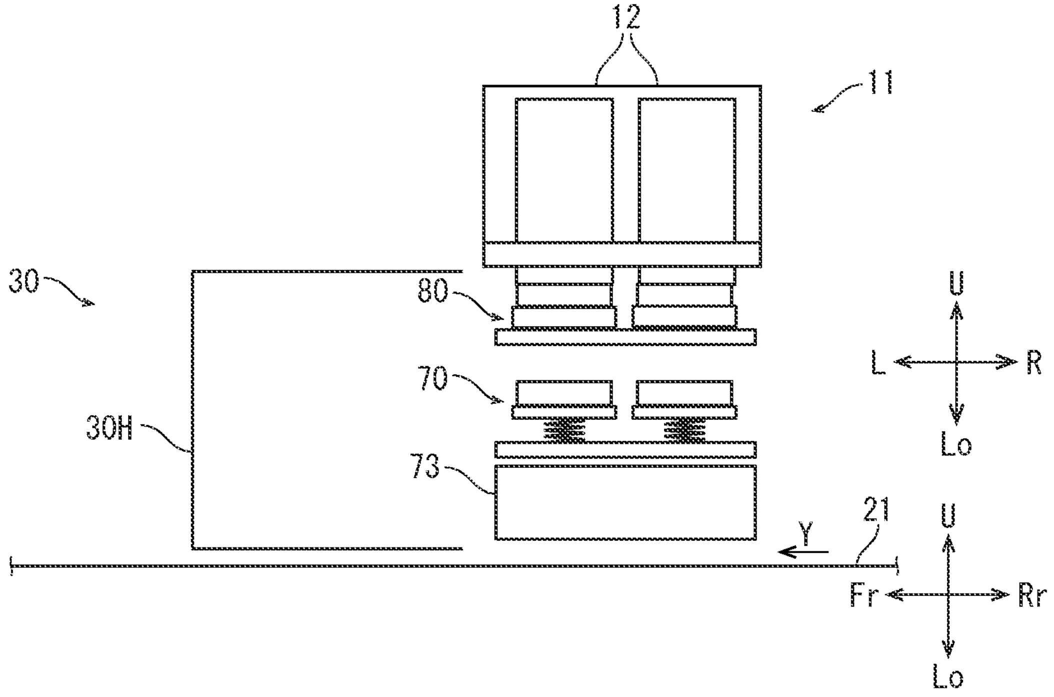
FIG. 16 is a cross-sectional view explaining the operation of the maintenance device and the head unit 11 according to the embodiment of the present disclosure.

Next, the control part 2 operates the lifting mechanism to lift the head unit 11 to the retreating position (see FIG. 15). The control part 2 then operates the wipe moving mechanism to house the wipe unit 80 in the housing 31 (see FIG. 13). Next, the control part 2 operates the lifting mechanism to lower the head unit 11 to the height where the nozzle surface 12F is in contact with the caps 72 (see FIG. 14).

When the image forming operation is performed, the control part 2 operates the lifting mechanism to lift the head unit 11 to the retreating position (see FIG. 13). Then, the control part 2 operates the cap moving mechanism to house the cap unit 70 in the housing 31 (see FIG. 12), and operates the lifting mechanism to lower the head unit 11 to the image forming position (see FIG. 11).

Next, the cap unit 70 will be described in detail. The cap unit 70 according to the present embodiment includes the cap 72 attached to and detached from the nozzle surface 12F of the inkjet head 12, a tank 73 storing humidifying liquid W, a first pipe 73A and a second pipe 73B connecting the cap 72 and the tank 73, a pump 74 provided in the first pipe 73A and pumping air in the tank 73 into the cap 72, and a vent port 72D provided in the cap 72.

[Tank] The tank 73 (see FIG. 10) is provided below the cap 72, and supported by the frame 71 of the cap unit 70. The tank 73 stores the humidifying liquid W and supplies moisture to the air above the humidifying liquid W. The humidifying liquid W is, for example, water. The tank 73 is formed in a rectangular box-like shape whose longitudinal direction is along the front-and-rear direction.

[First Pipe, Second Pipe] The tank 73 and the cap 72 are connected by the first pipe 73A and the second pipe 73B. The first pipe 73A and the second pipe 73B are connected to the upper portion of the tank 73 and the bottom portion 72B of the cap 72. The lower ends of the first pipe 73A and the second pipe 73B are positioned above the liquid level of the humidifying liquid W. The upper ends of the first pipe 73A and the second pipe 73B protrude above the bottom portion 72B of the cap 72 to prevent the waste liquid from flowing in, and are positioned below the upper edge of the cap 72 to prevent contact with the nozzle surface 12F. When the cap 72 is viewed from above (see FIG. 9), the upper ends of the first pipe 73A and the second pipe 73B are positioned on the center line of the cap 72 in the left-and-right direction.

[Pump] The pump 74 is provided in the first pipe 73A. The pump 74 is capable of normal rotation for pumping the air in the tank 73 into the cap 72 and reverse rotation for pumping the air in the cap 72 into the tank 73. The pump 74 is preferably one that can supply air, but it is preferable to use a diaphragm pump.

[Vent Port] The vent port 72D penetrating in the front-and-rear direction is provided on the rear wall of the recess 720 of the cap 72. The vent port 72D forms an air passage connecting the space in the cap 72 with a space (atmosphere) outside the cap 72. The vent port 72D is formed using a tube whose longitudinal direction is along the front-and-rear direction. In order not to block the air circulation through the second pipe 73B, it is desirable that a fluid resistance of the vent port 72D is larger than that of the second pipe 73B. A cross section of the vent port 72D is preferably a circle with an inner diameter of 0.05 mm or more and 10 mm or less, or a shape other than a circle with the same cross-sectional area (ellipse, rectangle, or the others). A length of the vent port 72D should be 0.1 mm or more and 1000 mm or less.

In order not to block the supply of water vapor from the first pipe 73A, it is desirable that the vent port 72D be provided on the side wall of the recess 72U of the cap 72 on the side closer to of the second pipe 73B. In order not to block the air circulation through the second pipe 73B, it is desirable that the vent port 72D be separated from the line L connecting the first pipe 73A and the second pipe 73B at the bottom portion 72B in a plan view. To prevent drying of the ink in the nozzle 12N, it is desirable that the vent port 72D be separated from the nozzle surface 12F. For example, the vent port 72D is preferably provided closer to the bottom portion 72B than the center portion of the side wall in the upper-and-lower direction.

Figure 17:
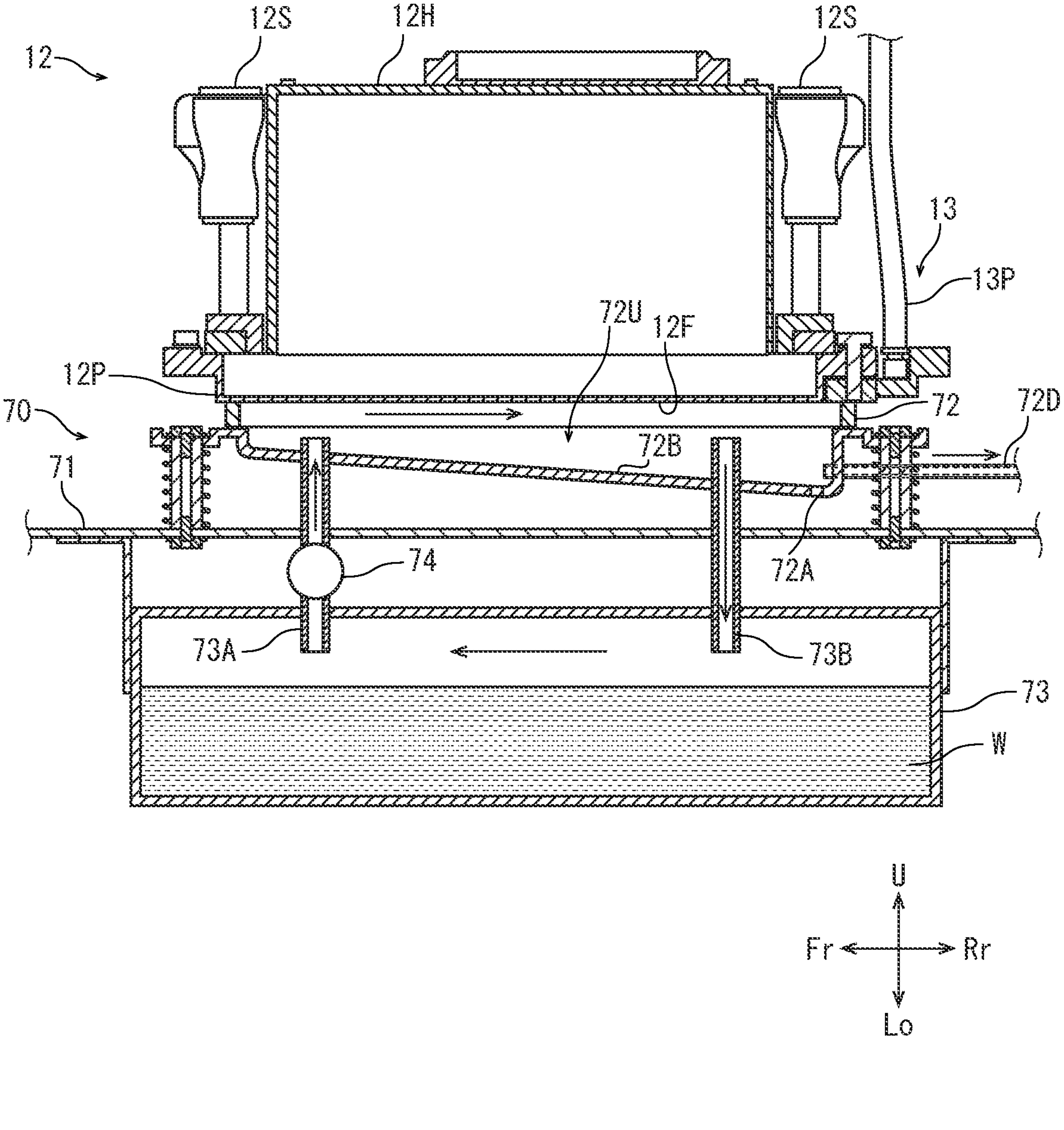
FIG. 17 is a cross-sectional view showing air circulation when a pump is normally rotated, according to the embodiment of the present disclosure.

Next, the operation of the cap unit 70 will be described. FIG. 17 is a cross-sectional view showing the air circulation when the pump 74 is normally rotated. Since the air in the tank 73 is in contact with the humidifying liquid W, the water vapor pressure is higher than the air outside the tank 73. When the pump 74 is normally rotated, the air in the tank 73 is pumped from the first pipe 73A into the cap 72 and flows along the nozzle surface 12F mainly from the front to the rear. As a result, the ink remaining in the nozzle 12N is humidified and an increase in viscosity of the ink is suppressed. The air whose water vapor pressure is lowered by the humidification of the ink returns to the tank 73 via the second pipe 73B. In the tank 73, the water vapor pressure increases again as the air is in contact with the humidifying liquid W. Since the air can flow between the inside and the outside of the cap 72 via the vent port 72D, changes in temperature and pressure in the cap 72 are moderated. As a result, condensation on the nozzle surface 12F and collapse of the meniscus in the nozzle 12N are suppressed.

Figure 18:
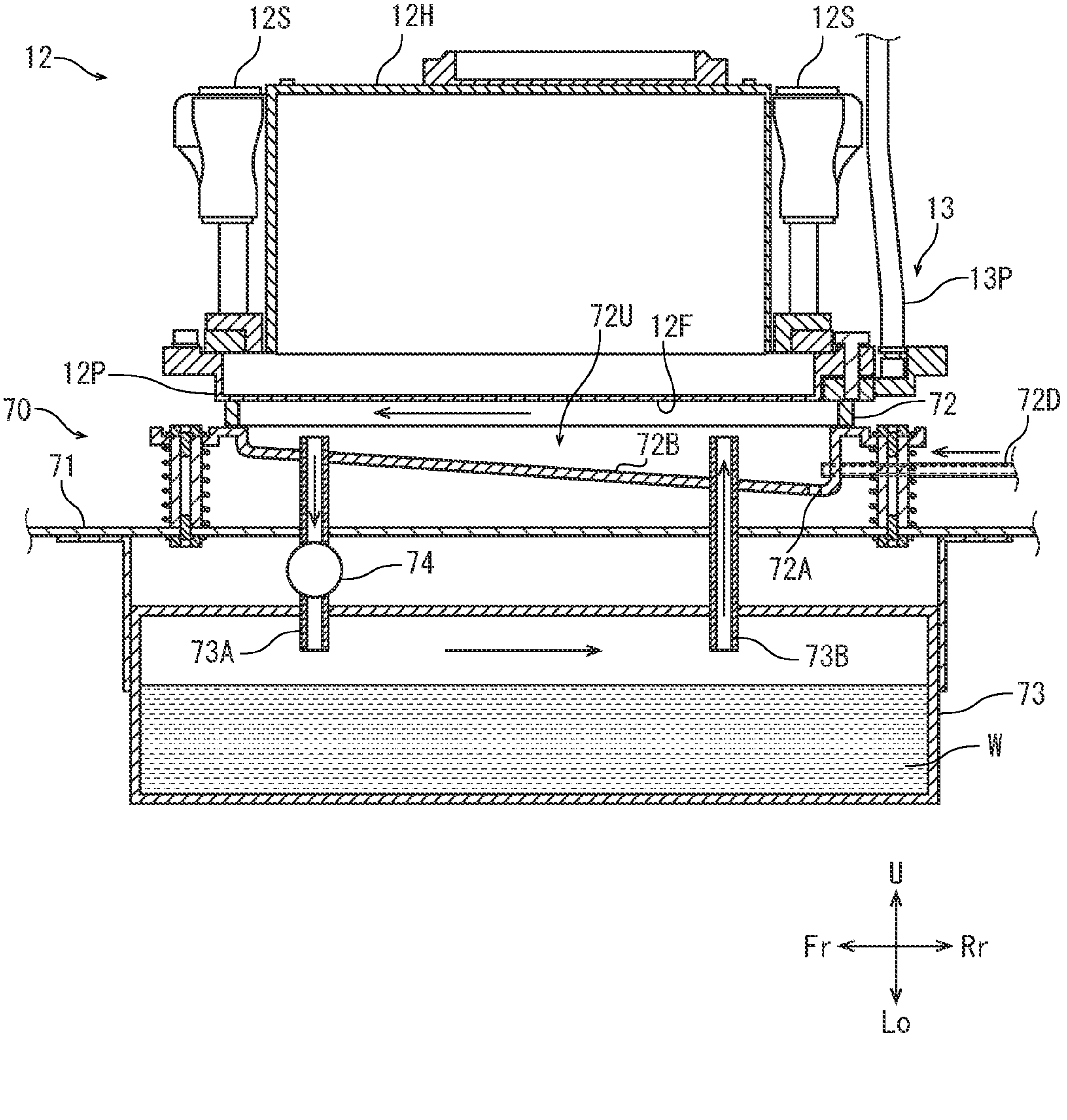
FIG. 18 is a cross-sectional view showing air circulation when the pump is reversely rotated, according to the embodiment of the present disclosure.

Here, since the vent port 72D is provided on the side of the second pipe 73B, due to the influence of the airflow flowing from the first pipe 73A side to the second pipe 73B side, an airflow from the inside to the outside of the cap 72 tends to occur near the vent port 72D. On the other hand, FIG. 18 is a cross-sectional view showing the air circulation when the pump 74 is reversely rotated. In this case, since the direction of the air circulation is opposite to the direction when the pump 74 is normally rotated, due to the influence of the air flow from the second pipe 73B side to the first pipe 73A side, an air flow from the outside to the inside of the cap 72 tends to occur near the vent port 72D. Therefore, under a condition where the condensation is likely to occur in the cap 72, it is considered that introducing the outside air with low humidity into the cap 72 by rotating the pump 74 in the reverse direction is effective to suppress the condensation.

It may be configured such that switching the rotation of the pump 74 between the normal direction and the reverse direction is performed according to the temperature and the humidity in the cap 72. For example, a sensor (not shown) for measuring the temperature and humidity is provided in the cap 72. In the storage part of the control part 2, a table (not shown) relating the temperature and humidity to the presence or absence of condensation is stored. When a combination of the temperature and humidity measured by the sensor corresponds to the condensation, the control part 2 switches the rotation of the pump 74 from the normal direction to the reverse direction. It may be configured such that switching the rotation of the pump 74 between the normal direction and the reverse direction is performed according to the air pressure in the cap 72.

The cap unit 70 according to the present embodiment described above includes the cap 72 to be attached to and detached from the nozzle surface 12F of the inkjet head 12, the tank 73 in which the humidifying liquid W is stored, the first pipe 73A and the second pipe 73B connecting the cap 72 and the tank 73, the pump 74 provided in the first pipe 73A for pumping the air in the tank 73 into the cap 72, and the vent port 72D provided in the cap 72. The air in the tank 73 is humidified with the humidifying liquid W and circulates in the order of the first pipe 73A, the cap 72, the second pipe 73B and the tank 73. In the cap 72, the humidified air suppresses the evaporation of moisture from the ink in the nozzle 12N. When the temperature in the cap 72 decreases, since the air pressure also decreases, the outside air is introduced into the cap 72 from the vent port 72D to moderate the decrease of the air temperature and pressure, air thereby suppressing the condensation. On the other hand, when the temperature in the cap 72 increases, since the air pressure also increases, the air is discharged out of the cap 72 through the vent port 72D to moderate the increase of the temperature and air pressure, thereby preventing the collapse of the meniscus. Therefore, according to the present embodiment, the humidified air can be supplied into the cap 72, and the condensation and pressure change in the cap 72 can be suppressed.

According to the cap unit 70 according to the present embodiment, the fluid resistance of the vent port 72D is larger than that of the second pipe 73B. According to this configuration, the circulation of the humidified air cannot be inhibited.

According to the cap unit 70 according to the present embodiment, the first pipe 73A and the second pipe 73B are connected to the bottom portion 72B of the cap 72, and the vent port 72D is provided in the side wall closer to the second pipe 73B, and in a plan view, is separated from the line L connecting the first pipe 73A and the second pipe 73B at the bottom portion 72B. According to this configuration, the circulation of the humidified air cannot be inhibited.

In addition, according to the cap unit 70 according to the present embodiment, the vent port 72D is separated from the nozzle surface 12F. According to this configuration, it is possible to suppress the influence of the airflow through the vent port 72D on the meniscus in the nozzle 12N.

In addition, according to the cap unit 70 according to the present embodiment, the vent port 72D is provided closer to the bottom portion 72B than the center portion of the side wall in the upper-and-lower direction. According to this configuration, the influence of the airflow through the vent port 72D on the meniscus in the nozzle 12N can be further suppressed.

In addition, according to the cap unit 70 of the present embodiment, the pump 74 can be normally rotated for feeding the air in the tank 73 into the cap 72 and reversely rotated for feeding the air in the cap 72 into the tank 73. According to this configuration, the humidity can be reduced when the humidity in the cap 72 is excessive.

The above embodiment may be modified as follows.

Figure 19:
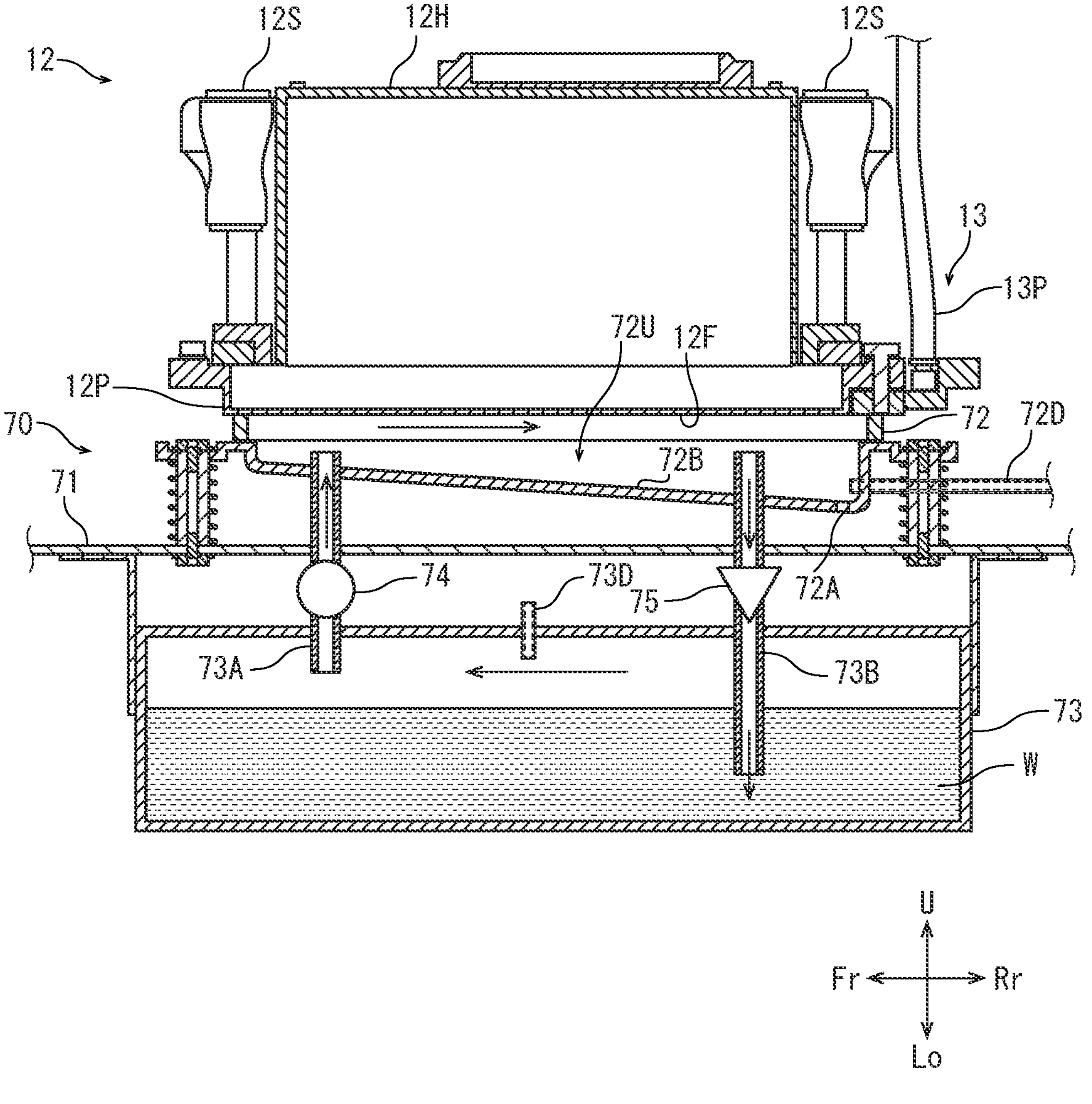
FIG. 19 is a cross-sectional view showing a modified example of the embodiment of the present disclosure.
Figure 20:
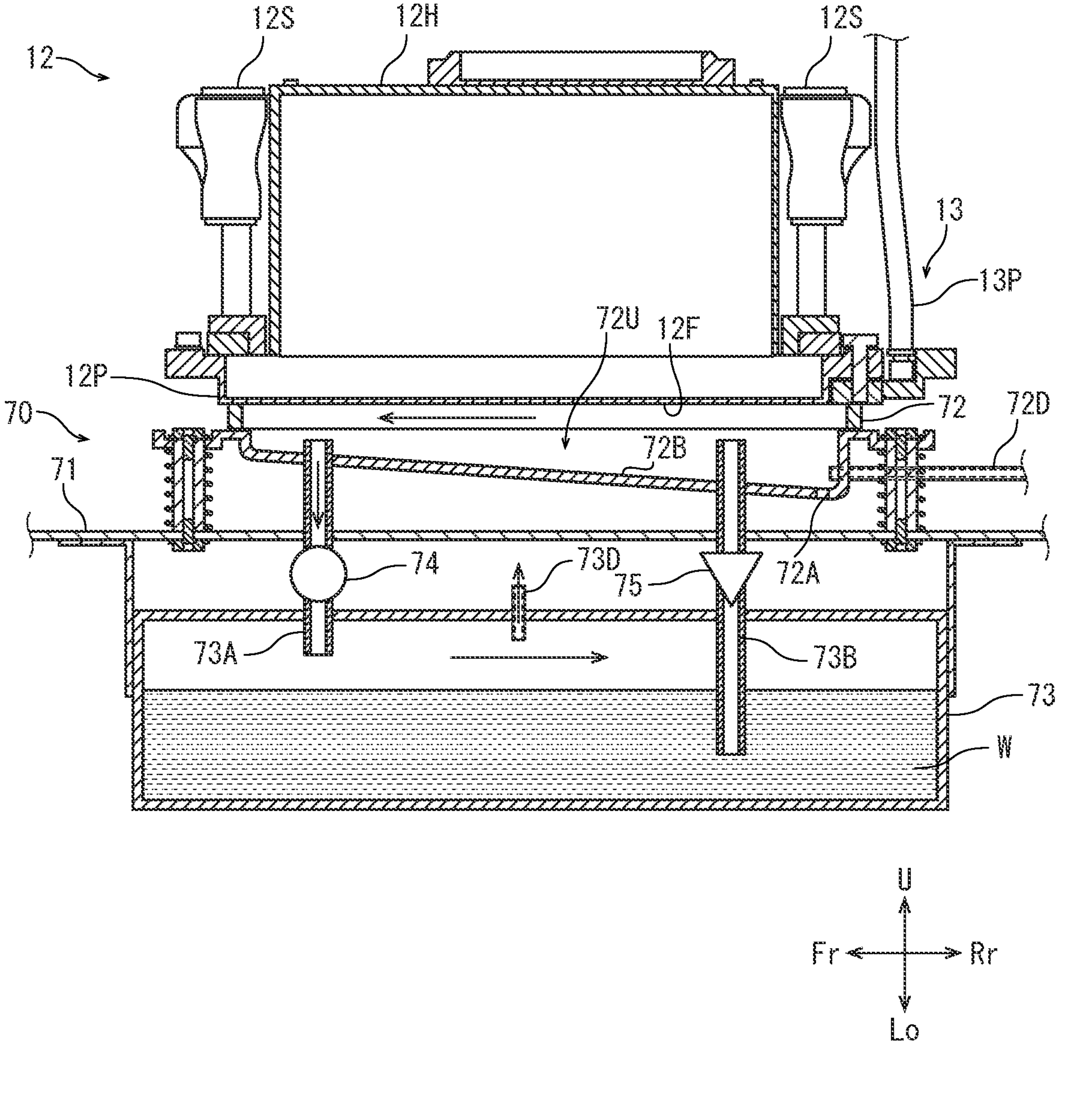
FIG. 20 is a cross-sectional view showing the modified example of the embodiment of the present disclosure.

FIG. 19 and FIG. 20 are cross-sectional views showing a modified example of the above embodiment. FIG. 19 shows when the pump 74 is normally rotated and FIG. 20 shows when the pump 74 is reversely rotated. In this modified example, one end of the second pipe 73B is positioned below the liquid level in the tank 73. The second pipe 73B includes a valve 75 to block the flow from the tank 73 to the cap 72. The vent port 73D is provided in the tank 73. According to this configuration, since the air fed from the second pipe 73B to the tank 73 passes through the humidifying liquid W, the water vapor pressure of the air can be increased to improve the humidification performance. In addition, when the pump 74 is reversely rotated, the humidifying liquid W can be prevented from flowing into the cap

72 through the second pipe 73B. In addition, since the pressurized air is released from the vent port 73D when the pump 74 is reversely rotated, the increase in the air pressure in the tank 73 can be suppressed.

The invention claimed is:

1. A cap unit comprising:

a cap attached to and detached from a nozzle surface of an inkjet head;

a tank in which humidifying liquid is stored;

a first pipe and a second pipe connecting the cap and the tank;

a pump provided in the first pipe and pumping air in the tank into the cap; and a vent port provided in the cap, wherein a fluid resistance of the vent port is larger than a fluid resistance of the second pipe.

2. The cap unit according to claim 1, wherein the first pipe and the second pipe are connected to a bottom portion of the cap, the vent port is provided in a side wall closer to the second pipe, and separated from a line connecting the first pipe and the second pipe on the bottom portion in a plan view.

3. The cap unit according to claim 2, wherein the bottom portion of the cap is inclined such that one end in a longitudinal direction of the nozzle surface is lower, and the vent port is provided in the side wall on a lower side of the bottom portion.

4. The cap unit according to claim 2, wherein the bottom portion of the cap is inclined such that one end in a longitudinal direction of the nozzle surface is lower, and the first pipe is connected to the higher bottom portion and the second pipe is connected to the lower bottom portion.

5. The cap unit according to claim 1, wherein the vent port is separated from the nozzle surface.

6. The cap unit according to claim 1, wherein the pump is rotated in a normal direction for pumping air in the tank into the cap and in a reverse direction for pumping air in the cap into the tank.

7. A cap unit comprising:

a cap attached to and detached from a nozzle surface of an inkjet head;

a tank in which humidifying liquid is stored;

a first pipe and a second pipe connecting the cap and the tank;

a pump provided in the first pipe and pumping air in the tank into the cap; and a vent port provided in the cap, wherein the vent port is provided closer to a bottom portion of the cap than a center portion of the side wall in an upper-and-lower direction.

8. A cap unit comprising:

a cap attached to and detached from a nozzle surface of an inkjet head;

a tank in which humidifying liquid is stored;

a first pipe and a second pipe connecting the cap and the tank;

a pump provided in the first pipe and pumping air in the tank into the cap; and a vent port provided in the cap, wherein one end of the second pipe is positioned below a liquid level of the tank.

9. The cap unit according to claim 8, wherein the second pipe is provided with a valve which blocks flow from the tank to the cap.

* * * * *